(12) United States Patent
Wu et al.

(10) Patent No.: US 8,254,769 B2
(45) Date of Patent: Aug. 28, 2012

(54) ANTI-SHAKE STRUCTURE FOR AUTO-FOCUS MODULAR

(75) Inventors: Fu-Yuan Wu, Yangmei Taoyuan (TW); Chao-Chang Hu, Yangmei Taoyuan (TW); Yi-Liang Chan, Yangmei Taoyuan (TW)

(73) Assignee: TDK Taiwan Corp., Taipei (TW)

( * ) Notice: Subject to any disclaimer, the term of this patent is extended or adjusted under 35 U.S.C. 154(b) by 203 days.

(21) Appl. No.: 12/717,596

(22) Filed: Mar. 4, 2010

(65) Prior Publication Data

US 2011/0217029 A1    Sep. 8, 2011

(51) Int. Cl.
*G03B 17/00* (2006.01)
(52) U.S. Cl. ............... 396/55; 348/208.11; 359/557
(58) Field of Classification Search .......... 396/55; 348/208.11; 359/557
See application file for complete search history.

(56) References Cited

U.S. PATENT DOCUMENTS

| 2002/0176713 A1* | 11/2002 | Kai et al. | 396/429 |
| 2009/0295929 A1* | 12/2009 | Lee et al. | 348/208.7 |
| 2011/0096178 A1* | 4/2011 | Ryu et al. | 348/208.2 |

FOREIGN PATENT DOCUMENTS

WO    WO 2009139543 A1 *  11/2009

* cited by examiner

*Primary Examiner* — W. B. Perkey
*Assistant Examiner* — Fang-Chi Chang
(74) *Attorney, Agent, or Firm* — Muncy, Geissler, Olds & Lowe, PLLC

(57) ABSTRACT

An anti-shake structure for auto-focus module includes an auto-focus module for driving a lens to move forward and rearward in a light entering path, i.e. in z-axis direction, so that the lens focuses light on an image sensor; a frame for holding the auto-focus module therein; a lens suspender with a compensation lens arranged thereon being connected to a plurality of suspension wires while the latter are connected at respective another end to the top cover plate of the frame, so that the compensation lens is correspondingly suspended in the frame in the light entering path and located behind the lens; and a shake compensation driving unit for driving the lens suspender to move horizontally in x-axis or y-axis direction, so as to compensate any image shift caused by hand shaking.

11 Claims, 4 Drawing Sheets

ANTI-SHAKE STRUCTURE FOR AUTO-FOCUS MODULAR

FIELD OF THE INVENTION

The present invention relates to an anti-shake (AS) structure for auto-focus (AF) module, and more particularly to an auto-focus module combined with an anti-shake structure for use with an advanced camera.

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. On the other hand, to highlight the differences between the advanced camera devices and the low-level camera devices, higher image quality and more functions, such as highly increased pixels, multi-point auto-focus (AF) function, anti-shake (AS) function, etc., have been further added to the advanced camera devices.

However, every new function added to the image capturing module of a camera device would necessitate the increase of a corresponding modular mechanism to thereby increase the volume of the image capturing module. Therefore, it has become a target of all image capturing module manufacturers to further reduce the volume of the capturing module that has more functions.

There are various types of auto-focus driving structures for the conventional miniature lens. Among others, the voice coil motor (VCM) is the currently most widely employed auto-focus driving structure. The VCM includes an assembly of windings, magnets and plate springs to hold a lens thereto, so that the lens is able to move forward and rearward in an optical axis direction to thereby achieve the object of auto focusing or zooming. The VCM has the advantages of small volume, low power consumption, accurately actuated displacement, and cost-effective, and is therefore very suitable for short-distance driving in miniature lens auto-focusing.

With respect to the anti-shake function, it is achieved mainly through several ways. For example, the imaging element can utilize a compensation movement of a mechanism supporting frame to offset the influence of shake during shooting picture on the forming of a blurred image. Or, the lens can be provided with a mechanical structure to eliminate the shake. Or, two gyro sensors can be used to detect any vibration of the imaging element in horizontal and vertical directions, and use push by magnetic force to compensate such vibration.

The same inventor of the present invention filed U.S. patent application Ser. No. 12/630,688 entitled "Anti-shake Auto-focus Module Structure" on Dec. 3, 2009. According to the disclosure of U.S. patent application Ser. No. 12/630,688, a movement signal generated by a shake sensor is used to drive the whole auto-focus module to instantaneously move horizontally in x-axis or y-axis direction, so as to compensate any shake caused by hands.

Now, based on the previous structural design, the inventor further designs a new anti-shake structure for the auto-focus module. Unlike the U.S. patent application Ser. No. 12/630,688 that teaches the instantaneous movement of the whole auto-focus module to compensate any shake, the new anti-shake structure in the present invention moves only one compensation lens in the camera lens to achieve the compensation of shake caused by hands, so that the anti-shake structure is simpler, the shake compensation can be driven with lower power consumption, and the effect of shake compensation can be produced more quickly to satisfy the requirement for use with an advanced camera lens module.

SUMMARY OF THE INVENTION

A primary object of the present invention is to provide an anti-shake structure for auto-focus module, so that an auto-focus module for an advanced camera lens is combined with an anti-shake structure.

To achieve the above and other objects, the anti-shake structure for auto-focus module according to an embodiment of the present invention is capable of capturing and focusing light on an image sensor covered by a sensor holder, and includes an auto-focus module for driving a lens to move forward or rearward in a light entering path, i.e. in z-axis direction, so that the light can be focused on the image sensor; a frame having a top cover plate with a central opening for holding the auto-focus module therein; a lens suspender having at least one compensation lens arranged thereon, and being connected to a plurality of suspension wires while the latter are connected at respective another end to the top cover plate of the frame, so that the compensation lens is correspondingly suspended in the light entering path and located behind the lens; and a shake compensation driving unit for driving the lens suspender to move horizontally in x-axis or y-axis direction, so as to compensate any shift of image caused by shaking of hands.

According to a technical aspect of the present invention, the shake compensation driving unit of the anti-shake structure for auto-focus module includes a magnet assembly having at least one x-axis magnet and at least one y-axis magnet; a winding assembly having at least one x-axis winding and at least one y-axis winding corresponding to the at least one x-axis magnet and the at least one y-axis magnet, respectively, for receiving a shake signal and generating electromagnetic fields correspondingly for driving the lens suspender and the compensation lens to move in x-axis or y-axis direction; and a displacement sensor assembly having an x-axis sensor and a y-axis sensor corresponding to the x-axis magnet and the y-axis magnet, respectively, for detecting a volume of displacement in x-axis or y-axis direction, so that the lens suspender and the compensation lens are precisely moved to a correct compensation position.

According to another technical aspect of the present invention, the magnet assembly of the anti-shake structure for auto-focus module is fixedly connected to an underside of the auto-focus module while the winding assembly and the displacement sensor assembly are connected to a top of the lens suspender. Alternatively, the winding assembly and the displacement sensor assembly are connected to the underside of the auto-focus module while the magnet assembly is fixedly connected to the top of the lens suspender. Alternatively, the winding assembly and the displacement sensor assembly are connected to a top of the sensor holder while the magnet assembly is fixedly connected to an underside of the lens suspender. Alternatively, the magnet assembly is connected to the top of the sensor holder while the winding assembly and the displacement sensor assembly are fixedly connected to the underside of the lens suspender.

To achieve the above and other objects, an anti-shake structure for auto-focus module according to another embodiment of the present invention is capable of capturing and focusing light on an image sensor covered by a sensor holder, and includes a frame having a top cover plate formed with a central opening and a plurality of through holes; an auto-focus module being fixedly connected to the top cover plate for driving a lens to move forward or rearward in a light entering path, i.e. in z-axis direction, so that the light can be focused on the image sensor; a lens suspender having at least one compensation lens arranged thereon, and being connected to a plurality of suspension wires while the latter have respective another end extended through the through holes on the top cover plate of the frame to connect to the sensor holder, so that the compensation lens is correspondingly suspended in the light entering path and located in front of the lens; and a shake compensation driving unit for driving the lens suspender to move horizontally in x-axis or y-axis direction, so as to compensate any shift of image caused by shaking of hands.

According to a technical aspect of the present invention, the magnet assembly for the shake compensation driving unit in the above embodiment is fixedly connected to a top of the top cover plate of the frame while the winding assembly and the displacement sensor assembly are connected to the underside of the lens suspender. Alternatively, the winding assembly and the displacement sensor assembly for the shake compensation driving unit in the above embodiment are fixedly connected to a top of the top cover plate of the frame while the magnet assembly is connected to the underside of the lens suspender.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
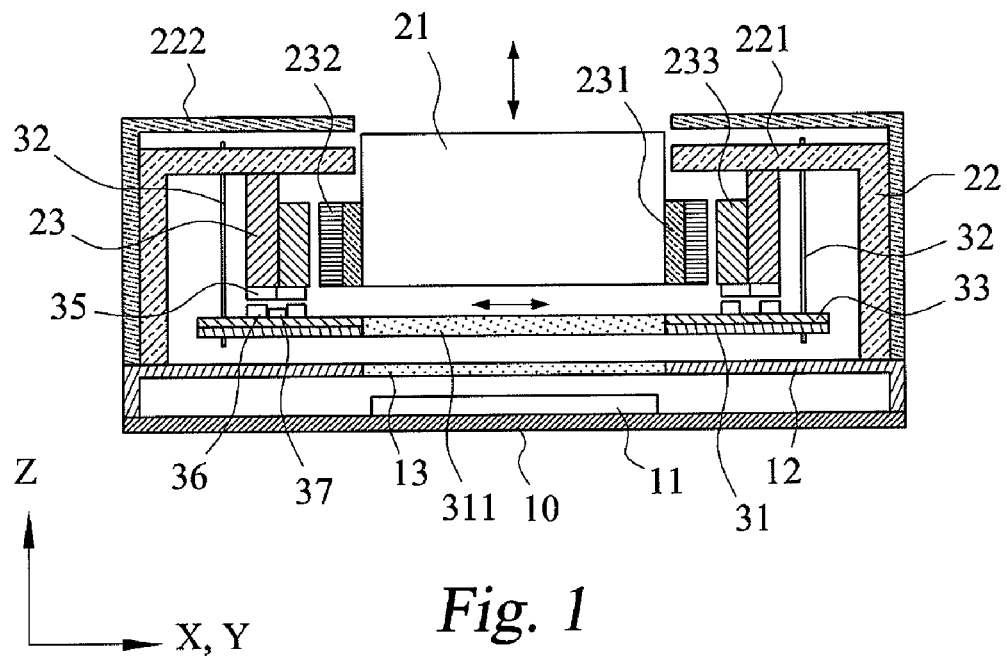
FIGS. 1 and 2 are sectioned side view and exploded perspective view, respectively, showing an anti-shake structure for auto-focus module according to a first embodiment of the present invention.

The present invention will now be described with some preferred embodiments thereof. For the purpose of easy to understand, elements that are the same in the preferred embodiments are denoted by the same reference numerals.

Figure 2:
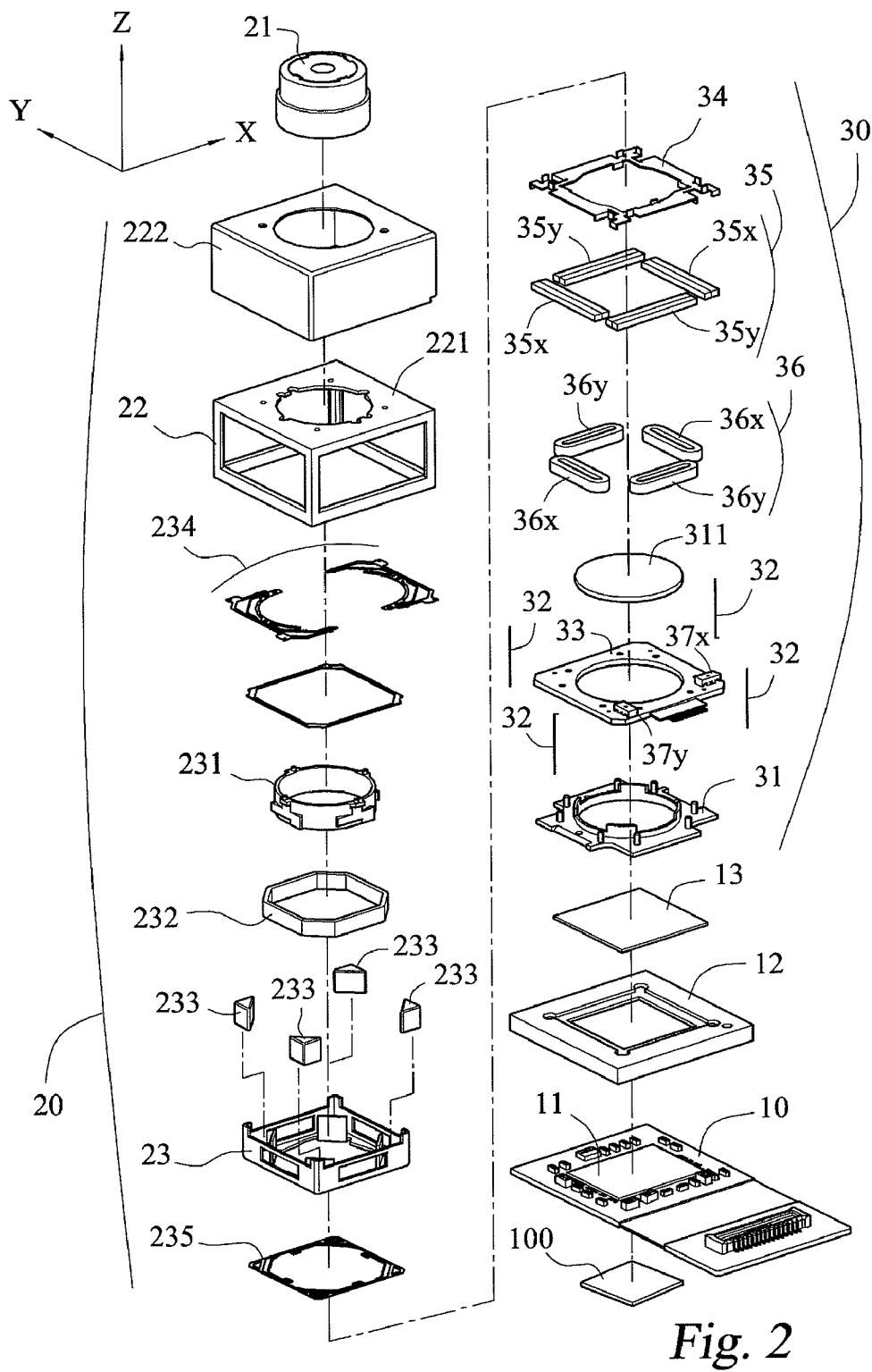

Please refer to FIGS. 1 and 2 that are sectioned side view and exploded perspective view, respectively, of an anti-shake structure for auto-focus module according to a first embodiment of the present invention. The anti-shake structure for auto-focus module of the present invention is mainly for installing on a hand-held device (not shown) to serve as an advanced image pickup module. The hand-held device can be, for example, a camera, a mobile phone, etc.

An advanced hand-held device is generally provided with a shake sensor, such as a Gyro sensor, an accelerometer, etc., for generating a shake signal in response to any shake of the hand-held device. The present invention is able to acquire the shake signal generated by the shake sensor and uses the shake signal as a shake sensor for the anti-shake structure of the present invention. Alternatively, the anti-shake structure of the present invention can be provided with a shake sensor 100.

The anti-shake structure for auto-focus modular according to the present invention mainly includes an image circuit board 10, an auto-focus module 20, and an anti-shake mechanism 30. On the image circuit board 10, there is provided an image sensor 11 being covered by a sensor holder 12. A filter 13 is set at a center of the sensor holder 12.

The auto-focus module 20 is able to drive a lens 21 to focus light. The auto-focus module 20 can be a voice coil motor (VCM), a step motor, a piezoelectric actuator, a supersonic motor, or other suitable driving elements. The lens 21 can capture light and image. The lens 21 and the image sensor 11 are aligned with each other on z-axis, that is, a line along which light enters into the lens 21. The auto-focus module 20 drives the lens 21 to move forward and rearward in a light entering path (i.e. z-axis direction), so that the lens 21 can focus the captured image on the image sensor 11.

The auto-focus module 20 includes a frame 22 having a top cover plate 221 formed with a round central opening, and an outer cover 222 enclosing the frame 22 therein. The outer cover 222 is also formed on a top with a round opening aligned with the round central opening on the top cover plate 221, allowing the lens 21 to be conveniently installed in the frame 22 via the two aligned round openings.

The auto-focus module 20 further includes a base 23 connected to an underside of the top cover plate 221 of the frame 22, a lens holder 231 for holding and locking the lens 21 thereto, a winding 232 arranged around the lens holder 231, and four magnets 233 arranged within the base 23 corresponding to the winding 232.

The lens holder 231 is connected to inner movable portions of an upper plate spring 234 and a lower plate spring 235, while the upper and lower plate springs 234, 235 are connected at respective outer fixed portions to the base 23, such that the whole auto-focus module 20 is fixedly connected to the top cover plate 221 to locate in the frame 22.

The anti-shake mechanism 30 is arranged between the image circuit board 10 and the auto-focus module 20, and includes a lens suspender 31, a plurality of suspension wires 32 and a shake compensation driving unit.

A compensation lens 311 is arranged at a center of the lens suspender 31. The suspension wires 32 are made of a flexible wire material and are electrically conductive to serve as conducting wires for transferring driving current to the shake compensation driving unit. Preferably, four suspension wires 32 are provided. The suspension wires 32 are connected at respective one end to the top cover plate 221 of the frame 22, and at the other end to the lens suspender 31, such that the lens suspender 31 and the compensation lens 311 are correspondingly suspended in the frame 22 in the light entering path to locate behind the lens 21.

The shake compensation driving unit is connected to the lens suspender 31, and includes an anti-shake driving circuit board 33, a fixing member 34, a magnet assembly 35, a winding assembly 36, and a displacement sensor assembly 37. An anti-shake driving circuit provided on the anti-shake driving circuit board 33 can receive the shake signal generated by the shake sensor 100, and drives the lens suspender 31 to move horizontally in x-axis direction or y-axis direction, so as to compensate any shift of image caused by hand shaking.

In the first embodiment of the present invention, the magnet assembly 35 of the shake compensation driving unit is fixedly connected to a bottom of the base 23 of the auto-focus module 20 via the fixing member 34 and forms an immovable portion of the shake compensation driving unit. The magnet assembly 35 includes at least one x-axis magnet 35x and at least one y-axis magnet 35y. On the other hand, the anti-shake driving circuit 33 of the shake compensation driving unit is connected to the lens suspender 31 with the winding assembly 36 and the displacement sensor assembly 37 connected to the anti-shake driving circuit 33 to form a movable portion of the shake compensation driving unit.

The winding assembly 36 includes at least one x-axis winding 36x and at least one y-axis winding 36y. The x-axis winding 36x and the y-axis winding 36y are located at positions corresponding to the x-axis magnet 35x and the y-axis magnet 35y, respectively. With these arrangements, when the x-axis winding 36x and the y-axis winding 36y generate electromagnetic fields, the x-axis winding 36x and the y-axis winding 36y can magnetically attract or repulse the x-axis magnet 35x and the y-axis magnet 35y to thereby drive the lens suspender 31 and the compensation lens 311 to move in x-axis direction or y-axis direction.

The displacement sensor assembly 37 includes an x-axis sensor 37x and a y-axis sensor 37y corresponding to the x-axis magnet 35x and the y-axis magnet 35y, respectively, for detecting a volume of displacement in x-axis direction or y-axis direction, so that the compensation lens 311 can be moved to a correct compensation position. Preferably, the displacement sensor assembly 37 can be a Hall sensor, a magneto-resistive sensor, a fluxgate sensor, an optical position sensor, or an optical encoder.

Figure 3:
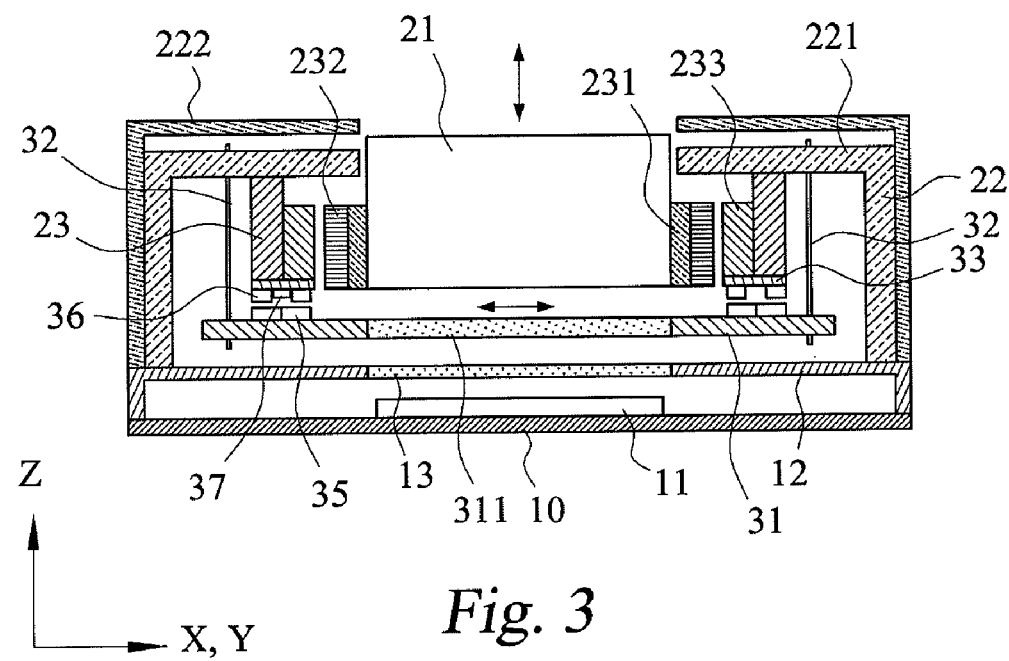
FIG. 3 is a sectioned side view showing an anti-shake structure for auto-focus module according to a second embodiment of the present invention.

FIG. 3 is a sectioned side view showing an anti-shake structure for auto-focus module according to a second embodiment of the present invention. The second embodiment is different from the first embodiment illustrated in FIG. 1 in that the components for the movable and immovable portions of the shake compensation driving unit are exchanged. That is, in the second embodiment, the anti-shake driving circuit board 33 of the shake compensation driving unit is fixedly connected to the bottom of the base 23 of the auto-focus module 20 with the winding assembly 36 and the displacement sensor assembly 37 connected to the anti-shake driving circuit board 33 to form the immovable portion of the shake compensation driving unit, while the magnet assembly 35 is connected to the lens suspender 31 corresponding to the winding assembly 36 and the displacement sensor assembly 37 to form the movable portion of the shake compensation driving unit.

Figure 4:
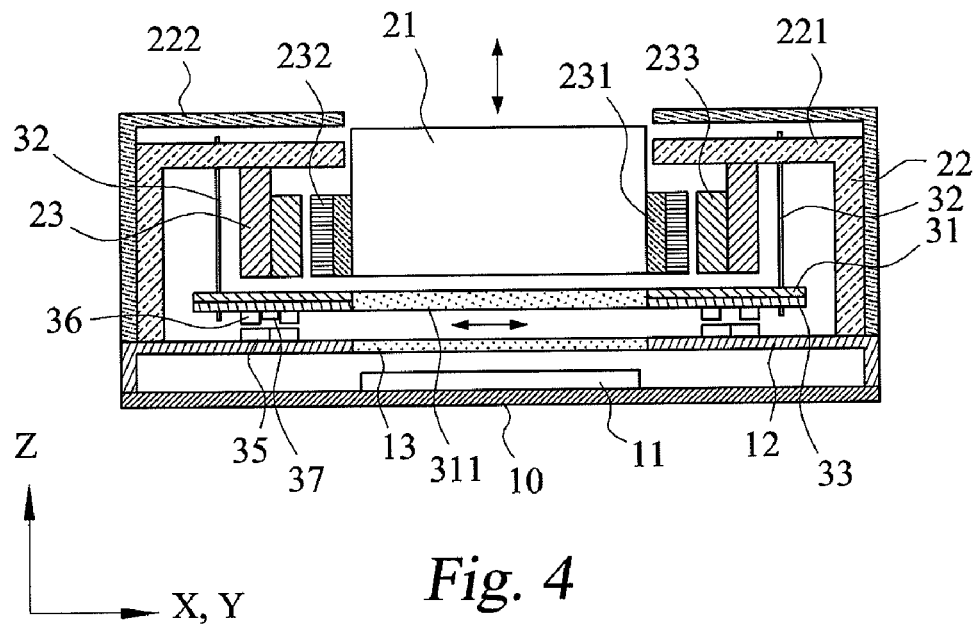
FIG. 4 is a sectioned side view showing an anti-shake structure for auto-focus module according to a third embodiment of the present invention.

FIG. 4 is a sectioned side view showing an anti-shake structure for auto-focus module according to a third embodiment of the present invention. In the third embodiment, the sensor holder 12 is connected to the bottom of the frame 22, and the magnet assembly 35 is connected to a top of the sensor holder 12 to form the immovable portion of the shake compensation driving unit. On the other hand, the anti-shake driving circuit board 33 is connected to an underside of the lens suspender 31 with the winding assembly 36 and the displacement sensor assembly 37 connected to the anti-shake driving circuit board 33 to form the movable portion of the shake compensation driving unit. Again, the winding assembly 36 and the displacement sensor assembly 37 are located at positions corresponding to the magnet assembly 35, enabling the driving of the lens suspender 31 to move in x-axis direction or y-axis direction.

Figure 5:
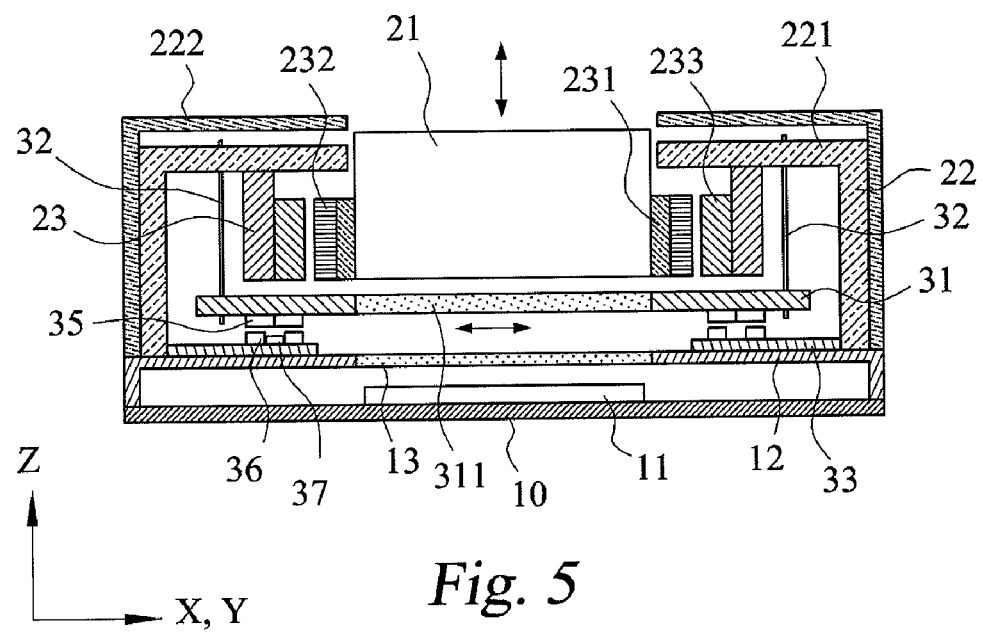
FIG. 5 is a sectioned side view showing an anti-shake structure for auto-focus module according to a fourth embodiment of the present invention.

FIG. 5 is a sectioned side view showing an anti-shake structure for auto-focus module according to a fourth embodiment of the present invention. The fourth embodiment is different from the third embodiment illustrated in FIG. 4 in that the components for the movable and immovable portions of the shake compensation driving unit are exchanged. That is, in the fourth embodiment, the anti-shake driving circuit board 33 of the shake compensation driving unit is fixedly connected to the top of the sensor holder 12 with the winding assembly 36 and the displacement sensor assembly 37 connected to the anti-shake driving circuit board 33 to form the immovable portion of the shake compensation driving unit, while the magnet assembly 35 is connected to the underside of the lens suspender 31 corresponding to the winding assembly 36 and the displacement sensor assembly 37 to form the movable portion of the shake compensation driving unit. With these arrangements, the fourth embodiment of the present invention can also achieve the same function of driving the lens suspender 31 to move in x-axis direction or y-axis direction.

Figure 6:
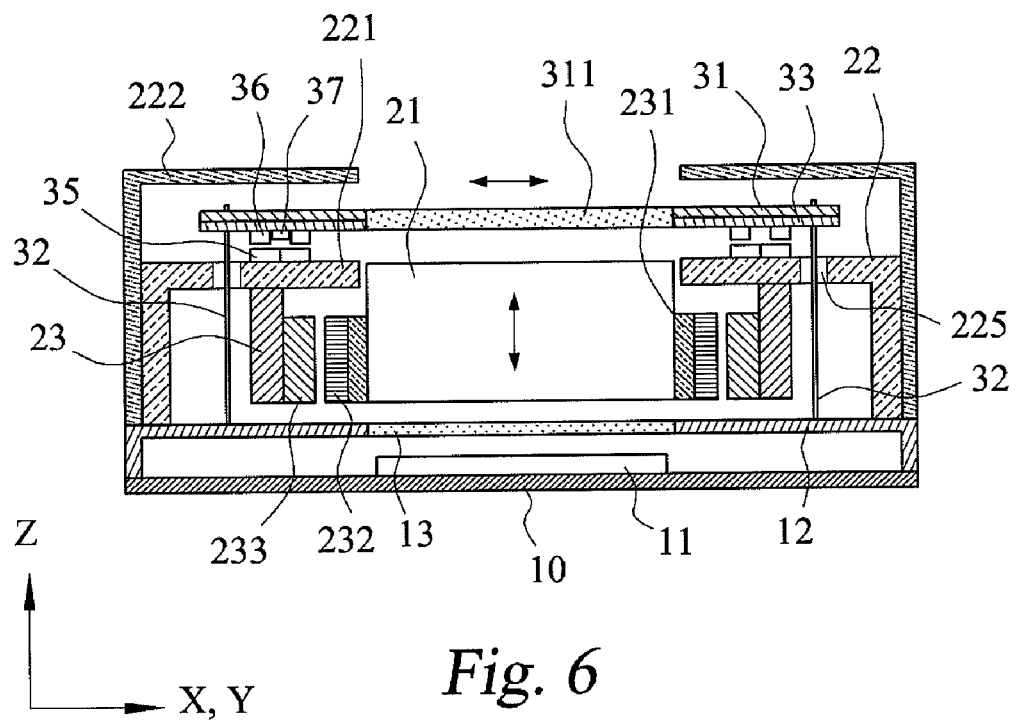
FIG. 6 is a sectioned side view showing an anti-shake structure for auto-focus module according to a fifth embodiment of the present invention.

FIG. 6 is a sectioned side view showing an anti-shake structure for auto-focus module according to a fifth embodiment of the present invention. In the fifth embodiment, the top cover plate 221 of the frame 22 is provided with a plurality of through holes 225 corresponding to the suspension wires 32. The suspension wires 32 are connected at respective one end to the lens suspender 31 with respective another end extended through the through holes 225 on the top cover plate 221 to connect to the sensor holder 12, so that the lens suspender 31 and the compensation lens 311 are correspondingly suspended in the outer cover 222 in front of the lens 21 and located in the light entering path.

In the fifth embodiment, the magnet assembly 35 is connected to a top of the top cover plate 221 of the frame 22 to form the immovable portion of the shake compensation driving unit. On the other hand, the anti-shake driving circuit board 33 is connected to an underside of the lens suspender 31 with the winding assembly 36 and the displacement sensor assembly 37 connected to the anti-shake driving circuit board 33 to form the movable portion of the shake compensation driving unit. Again, the winding assembly 36 and the displacement sensor assembly 37 are located at positions corresponding to the magnet assembly 35.

Figure 7:
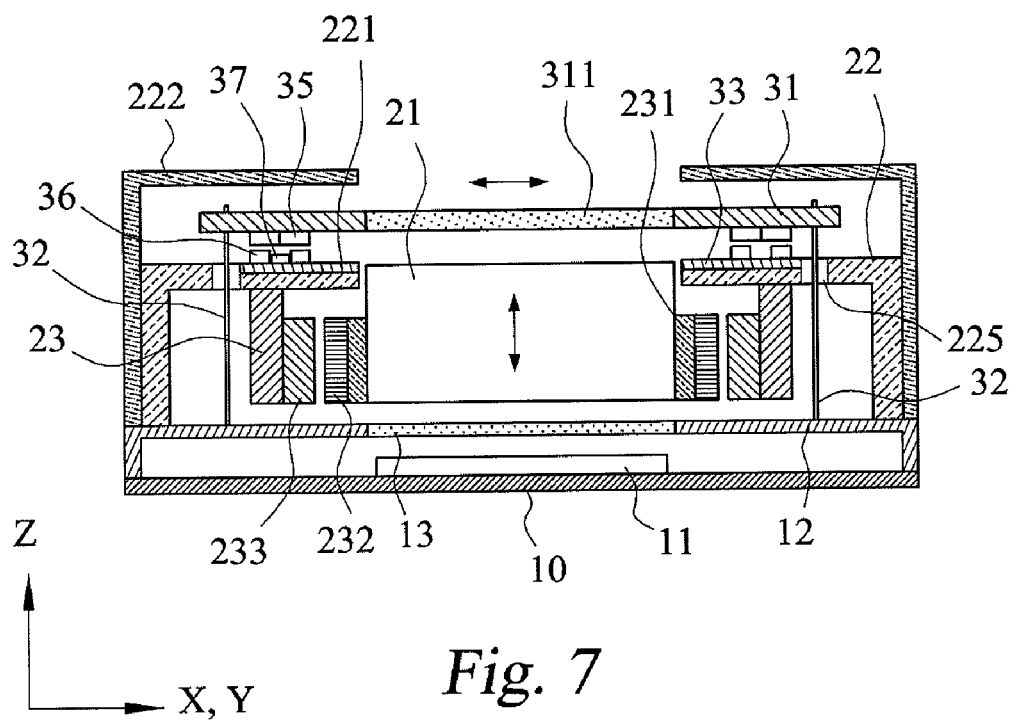
FIG. 7 is a sectioned side view showing an anti-shake structure for auto-focus module according to a sixth embodiment of the present invention.

FIG. 7 is a sectioned side view showing an anti-shake structure for auto-focus module according to a sixth embodiment of the present invention. The sixth embodiment is different from the fifth embodiment illustrated in FIG. 6 in that the components for the movable and immovable portions of the shake compensation driving unit are exchanged. That is, in the sixth embodiment, the anti-shake driving circuit board 33 is fixedly connected to the top of the top cover plate 221 of the frame 22 with the winding assembly 36 and the displacement assembly 37 connected to a top of the anti-shake driving circuit board 33 to form the immovable portion of the shake compensation driving unit. On the other hand, the magnet assembly 35 is connected to the underside of the lens suspender 31 to form the movable portion of the shake compensation driving unit. Again, the winding assembly 36 and the displacement assembly 37 are located at positions corresponding to the magnet assembly 35.

With the above arrangements, the anti-shake structure for auto-focus module according to the present invention is able to fully achieve the anti-shake purpose. The techniques illustrated in the embodiments of the present invention can be independently utilized. Alternatively, two or more of the illustrated techniques can be combined for use. For example, an additional set of the compensation lens and the lens suspender thereof can be further provided in the auto-focus module to achieve multi-fold shake compensation effect.

What is claimed is:

1. An anti-shake structure for auto-focus module for capturing and focusing light on an image sensor covered by a sensor holder, comprising:
   an auto-focus module for driving a lens to move forward and rearward in a light entering path, i.e. in z-axis direction, so that the lens focuses the captured light on the image sensor;
   a frame having a top cover plate formed with a central opening for holding the auto-focus module therein;
   a lens suspender with at least one compensation lens arranged thereon, the lens suspender being connected to a plurality of suspension wires while the suspension wires are connected at respective one end opposite to the lens suspender to the top cover plate of the frame, so that the compensation lens is correspondingly suspended in the frame in the light entering path and located behind the lens;
   the lens and the compensation lens moving independently of each other, the lens moving in the z-axis direction and the compensation lens moving in the x-axis direction and the y-axis direction; and
   a shake compensation driving unit for driving the lens suspender to move horizontally in x-axis direction or y-axis direction, so as to compensate any shift of image caused by hand shaking.

2. The anti-shake structure for auto-focus module as claimed in claim 1, further comprising a shake sensor for sensing a shake and generating a shake signal correspondingly;
   and the shake signal being sent to the shake compensation driving unit for use as a basis of driving the lens suspender to move horizontally in x-axis direction or y-axis direction.

3. The anti-shake structure for auto-focus module as claimed in claim 1, wherein the suspension wires are made of a flexible wire material.

4. The anti-shake structure for auto-focus module as claimed in claim 1, wherein the suspension wires are electrically conductive to serve as conducting wires for transferring driving current to the shake compensation driving unit.

5. The anti-shake structure for auto-focus module as claimed in claim 1, wherein the shake compensation driving unit comprising:
   a magnet assembly including at least one x-axis magnet and at least one y-axis magnet; and
   a winding assembly including at least one x-axis winding and at least one y-axis winding corresponding to the x-axis magnet and the y-axis magnet, respectively, for receiving the shake signal and generating electromagnetic fields correspondingly, so as to drive the lens suspender and the compensation lens to move in x-axis direction or y-axis direction.

6. The anti-shake structure for auto-focus module as claimed in claim 5, wherein the shake compensation driving unit further comprising a displacement sensor assembly; the displacement sensor assembly including an x-axis sensor and a y-axis sensor corresponding to the x-axis magnet and the y-axis magnet, respectively, for detecting a volume of displacement in x-axis direction or y-axis direction, so that the lens suspender and the compensation lens are precisely moved to a correct compensation position.

7. The anti-shake structure for auto-focus module as claimed in claim 6, wherein the x-axis sensor and the y-axis sensor are displacement sensors selected from the group consisting of a Hall sensor, a magneto-resistive sensor, a fluxgate sensor, an optical position sensor, and an optical encoder.

8. The anti-shake structure for auto-focus module as claimed in claim 5, wherein the magnet assembly is fixedly connected to an underside of the auto-focus module, and the winding assembly is connected to a top of the lens suspender.

9. The anti-shake structure for auto-focus module as claimed in claim 5, wherein the winding assembly is fixedly connected to an underside of the auto-focus module, and the magnet assembly is connected to a top of the lens suspender.

10. The anti-shake structure for auto-focus module as claimed in claim 5, wherein the winding assembly is fixedly connected to a top of the sensor holder, and the magnet assembly is connected to an underside of the lens suspender.

11. The anti-shake structure for auto-focus module as claimed in claim 5, wherein the magnet assembly is fixedly connected to a top of the sensor holder, and the winding assembly is connected to an underside of the lens suspender.

* * * * *